(12) United States Patent
Lax et al.

(10) Patent No.: US 8,433,611 B2
(45) Date of Patent: Apr. 30, 2013

(54) SELECTION OF ADVERTISEMENTS FOR PLACEMENT WITH CONTENT

(75) Inventors: Reuven Lax, Seattle, WA (US); Poorva Arankalle, Redmond, WA (US); Shamim Samadi, Mountain View, CA (US); Rajas Moonka, San Ramon, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 11/850,652

(22) Filed: Sep. 5, 2007

(65) Prior Publication Data

US 2009/0006375 A1    Jan. 1, 2009

Related U.S. Application Data

(60) Provisional application No. 60/946,702, filed on Jun. 27, 2007.

(51) Int. Cl.
*G06Q 30/00* (2012.01)
(52) U.S. Cl.
USPC ............... 705/14.4; 707/706; 705/14.49
(58) Field of Classification Search ............ 705/14, 705/14.4, 14.49; 707/706
See application file for complete search history.

(56) References Cited

U.S. PATENT DOCUMENTS

| | | | |
|---|---|---|---|
| 5,649,060 A | 7/1997 | Ellozy et al. | |
| 5,664,227 A | 9/1997 | Mauldin et al. | |
| 5,724,521 A | 3/1998 | Dedrick | |
| 5,740,549 A | 4/1998 | Reilly et al. | |
| 5,848,397 A | 12/1998 | Marsh et al. | |
| 5,948,061 A | 9/1999 | Merriman | |
| 6,026,368 A | 2/2000 | Brown et al. | |
| 6,044,376 A | 3/2000 | Kurtzman, II | |
| 6,078,914 A | 6/2000 | Redfern | |
| 6,091,416 A | 7/2000 | Cragun | |
| 6,144,944 A | 11/2000 | Kurtzman, II et al. | |
| 6,167,382 A | 12/2000 | Sparks et al. | |
| 6,188,398 B1 | 2/2001 | Collins-Rector et al. | |
| 6,269,361 B1 | 7/2001 | Davis et al. | |
| 6,282,548 B1 | 8/2001 | Burner et al. | |
| 6,282,713 B1 | 8/2001 | Kitsukawa et al. | |
| 6,393,158 B1 | 5/2002 | Gould et al. | |

(Continued)

FOREIGN PATENT DOCUMENTS

| | | |
|---|---|---|
| CN | 1728781 A | 2/2006 |
| CN | 102112009 | 6/2011 |

(Continued)

OTHER PUBLICATIONS

International Search Report and Written Opinion for PCT Application No. PCT/US2008/068624, dated Aug. 4, 2009, 12 pages.

(Continued)

*Primary Examiner* — Mahesh Dwivedi
(74) *Attorney, Agent, or Firm* — Fish & Richardson P.C.

(57) ABSTRACT

Methods, systems, and apparatus, including computer program products, for selecting advertisements. A request for sponsored content for presentation with a content item in a document is received. One or more candidate sponsored content items are identified based on one or more criteria. The criteria includes information related to the content item independent of the document, and information related to the document. One or more of the candidate sponsored content items are selected. The selected sponsored content items are transmitted for presentation with the content item.

33 Claims, 6 Drawing Sheets

U.S. PATENT DOCUMENTS

| | | |
|---|---|---|
| 6,401,075 B1 | 6/2002 | Mason et al. |
| 6,615,270 B2 | 9/2003 | Gould et al. |
| 6,621,980 B1 | 9/2003 | Gould et al. |
| 6,698,020 B1* | 2/2004 | Zigmond et al. ............... 725/34 |
| 6,771,290 B1 | 8/2004 | Hoyle |
| 6,847,977 B2 | 1/2005 | Abajian |
| 6,976,028 B2 | 12/2005 | Fenton et al. |
| 6,978,470 B2 | 12/2005 | Swix et al. |
| 6,985,882 B1 | 1/2006 | Del Sesto |
| 6,990,496 B1 | 1/2006 | McGee, III et al. |
| 6,996,564 B2 | 2/2006 | Lester et al. |
| 7,039,599 B2 | 5/2006 | Merriman |
| 7,043,746 B2 | 5/2006 | Ma |
| 7,055,103 B2 | 5/2006 | Lif |
| 7,058,963 B2 | 6/2006 | Kendall et al. |
| 7,136,875 B2 | 11/2006 | Anderson et al. |
| 7,158,966 B2 | 1/2007 | Brill et al. |
| 7,165,069 B1 | 1/2007 | Kahle et al. |
| 7,181,447 B2 | 2/2007 | Curtis et al. |
| 7,194,527 B2 | 3/2007 | Drucker et al. |
| 7,266,198 B2 | 9/2007 | Medvinsky |
| 7,383,258 B2 | 6/2008 | Harik et al. |
| 7,454,509 B2 | 11/2008 | Boulter et al. |
| 7,467,218 B2 | 12/2008 | Gould et al. |
| 7,506,356 B2 | 3/2009 | Gupta et al. |
| 7,555,557 B2 | 6/2009 | Bradley et al. |
| 7,559,017 B2 | 7/2009 | Datar et al. |
| 7,584,490 B1 | 9/2009 | Schlack |
| 7,593,965 B2 | 9/2009 | Gabriel |
| 7,613,691 B2 | 11/2009 | Finch |
| 7,630,021 B2 | 12/2009 | Matsuzaka et al. |
| 7,657,519 B2 | 2/2010 | Anderson et al. |
| 7,769,819 B2 | 8/2010 | Lerman et al. |
| 7,806,329 B2 | 10/2010 | Dmitriev et al. |
| 7,809,802 B2 | 10/2010 | Lerman et al. |
| 7,912,217 B2 | 3/2011 | Baugher et al. |
| 7,937,724 B2 | 5/2011 | Clark et al. |
| 7,966,632 B1 | 6/2011 | Pan et al. |
| 7,986,372 B2 | 7/2011 | Ma et al. |
| 8,041,601 B2 | 10/2011 | Fikes et al. |
| 8,132,202 B2 | 3/2012 | Swix et al. |
| 8,156,176 B2 | 4/2012 | Lerman et al. |
| 8,243,017 B2 | 8/2012 | Broderson et al. |
| 8,243,203 B2 | 8/2012 | Suh |
| 2001/0003214 A1 | 6/2001 | Shastri et al. |
| 2002/0116716 A1 | 8/2002 | Sideman |
| 2002/0147782 A1 | 10/2002 | Dimitrova et al. |
| 2003/0061305 A1 | 3/2003 | Copley et al. |
| 2003/0154128 A1 | 8/2003 | Liga et al. |
| 2003/0188308 A1 | 10/2003 | Kizuka |
| 2004/0059708 A1 | 3/2004 | Dean et al. |
| 2004/0133910 A1 | 7/2004 | Gordon et al. |
| 2004/0226038 A1 | 11/2004 | Choi |
| 2005/0028190 A1 | 2/2005 | Rodriguez et al. |
| 2005/0034151 A1 | 2/2005 | Abramson |
| 2005/0091311 A1 | 4/2005 | Lund et al. |
| 2005/0114198 A1 | 5/2005 | Koningstein et al. |
| 2005/0207442 A1 | 9/2005 | Zoest et al. |
| 2006/0013555 A1 | 1/2006 | Poslinski |
| 2006/0015904 A1 | 1/2006 | Marcus |
| 2006/0026628 A1 | 2/2006 | Wan et al. |
| 2006/0053470 A1 | 3/2006 | Colter et al. |
| 2006/0059510 A1 | 3/2006 | Huang et al. |
| 2006/0090182 A1 | 4/2006 | Horowitz et al. |
| 2006/0106709 A1 | 5/2006 | Chickering et al. |
| 2006/0129533 A1 | 6/2006 | Purvis |
| 2006/0140584 A1 | 6/2006 | Ellis et al. |
| 2006/0179453 A1 | 8/2006 | Kadie et al. |
| 2006/0214947 A1 | 9/2006 | Boose et al. |
| 2006/0221222 A1 | 10/2006 | Hirasawa |
| 2006/0224496 A1 | 10/2006 | Sandholm et al. |
| 2006/0224693 A1 | 10/2006 | Gaidemak et al. |
| 2006/0247998 A1 | 11/2006 | Gopalakrishnan |
| 2006/0259588 A1 | 11/2006 | Lerman et al. |
| 2006/0259589 A1 | 11/2006 | Lerman et al. |
| 2006/0271977 A1 | 11/2006 | Lerman et al. |
| 2006/0277567 A1 | 12/2006 | Kinnear |
| 2007/0073579 A1 | 3/2007 | Immorlica et al. |
| 2007/0078708 A1 | 4/2007 | Yu et al. |
| 2007/0078709 A1 | 4/2007 | Rajaram |
| 2007/0089127 A1 | 4/2007 | Flickinger et al. |
| 2007/0100690 A1* | 5/2007 | Hopkins .................... 705/14 |
| 2007/0112630 A1* | 5/2007 | Lau et al. .................... 705/14 |
| 2007/0113240 A1 | 5/2007 | McLean et al. |
| 2007/0130602 A1 | 6/2007 | Gulli et al. |
| 2007/0157228 A1 | 7/2007 | Bayer et al. |
| 2007/0159522 A1 | 7/2007 | Neven |
| 2007/0204310 A1* | 8/2007 | Hua et al. .................... 725/88 |
| 2007/0245242 A1 | 10/2007 | Yagnik |
| 2007/0277205 A1 | 11/2007 | Grannan |
| 2007/0282893 A1* | 12/2007 | Smith et al. ................ 707/102 |
| 2007/0288950 A1 | 12/2007 | Downey et al. |
| 2008/0004948 A1 | 1/2008 | Flake et al. |
| 2008/0005166 A1 | 1/2008 | Cragun et al. |
| 2008/0021775 A1* | 1/2008 | Lerman et al. ............. 705/14 |
| 2008/0027798 A1* | 1/2008 | Ramamurthi et al. ...... 705/14 |
| 2008/0033806 A1* | 2/2008 | Howe et al. ................ 705/14 |
| 2008/0066107 A1 | 3/2008 | Moonka |
| 2008/0092159 A1* | 4/2008 | Dmitriev et al. ............ 725/34 |
| 2008/0092182 A1 | 4/2008 | Conant |
| 2008/0098420 A1* | 4/2008 | Khivesara et al. .......... 725/32 |
| 2008/0155585 A1 | 6/2008 | Craner et al. |
| 2008/0155588 A1* | 6/2008 | Roberts et al. .............. 725/34 |
| 2008/0163071 A1* | 7/2008 | Abbott et al. .............. 715/748 |
| 2008/0189169 A1* | 8/2008 | Turpin et al. ................ 705/10 |
| 2008/0201361 A1* | 8/2008 | Castro et al. ............ 707/103 R |
| 2008/0229353 A1 | 9/2008 | Morris et al. |
| 2008/0249855 A1* | 10/2008 | Collins et al. .............. 705/14 |
| 2008/0263583 A1 | 10/2008 | Heath |
| 2008/0276266 A1 | 11/2008 | Huchital |
| 2008/0300974 A1 | 12/2008 | Bhandari et al. |
| 2008/0306999 A1 | 12/2008 | Finger et al. |
| 2009/0006375 A1 | 1/2009 | Lax et al. |
| 2009/0132507 A1 | 5/2009 | Kadambi et al. |
| 2009/0165041 A1 | 6/2009 | Penberthy et al. |
| 2010/0174607 A1 | 7/2010 | Henkin et al. |
| 2010/0186028 A1 | 7/2010 | Moore et al. |
| 2010/0278453 A1 | 11/2010 | King |
| 2011/0131595 A1 | 6/2011 | Xue et al. |
| 2011/0289531 A1 | 11/2011 | Moonka et al. |

FOREIGN PATENT DOCUMENTS

| | | |
|---|---|---|
| JP | 2003-242372 | 8/2003 |
| JP | 2006-155384 | 6/2006 |
| KR | 10-2006-00992 53 | 9/2006 |
| WO | WO 97/21183 | 6/1997 |
| WO | WO99/66719 | 12/1999 |
| WO | WO01/50296 | 7/2001 |
| WO | WO0150296 | 7/2001 |
| WO | WO03/084219 | 10/2003 |
| WO | WO 2006/111912 | 10/2006 |
| WO | WO 2008-072874 | 6/2008 |

OTHER PUBLICATIONS

International Preliminary Report on Patentability for PCT Application No. PCT/US2008/068624, dated Jan. 5, 2010, 6 pages.

EP Communication from European Application No. 08781112.1 mailed Oct. 26, 2010, 4 pages.

European Search Report issued in international application No. 08756776.4 on Apr. 20, 2001, 3 pages.

Communication Pursuant to Article 94(3) EPC issued in international application No. 08756776.4 on Apr. 29, 2011, 7 pages.

PCT International Search Report and Written Opinion, PCT/US2008/062442, Jul. 14, 2008.

PCT International Search Report and Written Opinion, PCT/US2008/062103, Aug. 26, 2008.

International Preliminary Report on Patentability issued in international application No. PCT/US2008/062103 on Nov. 3, 2009, 6 pages.

International Preliminary Report on Patentability issued in international application No. PCT/US2008/062442 on Nov. 3, 2009, 7 pages.

International Preliminary Report on Patentability issued in international application No. PCT/US2008/066175 on Dec. 11, 2009, 7 pages.

AdForce, Inc., S-1/A SEC Filing, May 6, 1999.
AdKnowledge Campaign Manager: Reviewer's Guide, Adknowledge, Aug. 1998.
AdKnowledge Market Match Planner: Reviewer's Guide, AdKnowledge, May 1998.
Ad-Star.com website archive from www.Archive.org. Apr. 12, 1997 and Feb. 1, 1997.
Baluja et al. "Video Suggestion and Discovery for YouTube: Taking Random Walks through the View Graph", ACM, WW 2008, Apr. 21-25, 2008.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency", Oct. 4, 1999.
Greg Sandoval: "YouTube: Too rough for advertisers?" [online] [retrieved on Apr. 21, 2006]. Retrieved from the Internet: < URL:http://www.news.com>, 2 pages.
Information Access Technologies, Inc., Aaddzz.com website archive from www.Archive.org., archived on Jan. 30, 1998.
Lowe, D.G., "Object Recognition from Local Scale-Invariant Features," Proc. Seventh IEEE Int'l Conf on Computer Vision ICCV 99, Kerkyra, Greece, Sep. 20-27, 1999, pp. 1150-1157.
Raoul Emme, International Search Report and the Written Opinion in PCT/US2007/078299, mailed Feb. 5, 2008, 29 pages.
So Young Doo, International Search Report and the Written Opinion in PCT/US2008/060859, mailed Sep. 26, 2008, 10 pages.
Dorothée Mülhausen, International Preliminary Report on Patentability in PCT/US2007/078299, mailed Mar. 26, 2009, 14 pages.
International Preliminary Report on Patentability for PCT Application No. PCT/US2008/066175, mailed Dec. 23, 2009, 7 pgs.
International Search Report and Written Opinion from International Application No. PCT/US08/66175, mailed Jun. 9, 2009, 8 pgs.
International Preliminary Report on Patentability from International Application No. PCT/US2008/073914, mailed Mar. 4, 2010, 7 pgs.
International Search Report and Written Opinion from International Application No. PCT/US2008/073914 mailed Jun. 23, 2009, 14 pgs.
Masashi Honda, International Preliminary Report on Patentability in PCT/US2008/060859, mailed Oct. 29, 2009, 6 pages.
Mahesh Dwivedi, International Preliminary Report on Patentability for PCT Application No. PCT/US2008/068624, dated Jan. 5, 2010, 6 pages.
Jung Jin Kim, International Search Report and the Written Opinion in PCT/US2009/052866, mailed Mar. 18, 2010, 11 pages.
Authorized officer Simin Baharlou, International Preliminary Report on Patentability in PCT/US2009/052866, mailed Feb. 17, 2011, 7 pages.
Supplementary EP Search Report in EP 09 80 5508, mailed Nov. 3, 2011, 5 pages.
Chinese Office Action in Chinese Application No. 200980130845.X, dated Dec. 27, 2011, 17 pages.
Supplementary EP Search Report in EP 08 74 6298, mailed Jan. 23, 2012, 7 pages.
JP Office Action in Application No. 2009-528455, dated Aug. 13, 2012, 7 pages.

PC World, Steve Bass's Tips & Tweaks., http//blogs.pcworld.com/tipsandtweaks/archives/006418/html, downloaded Feb. 14, 2011, 2 pages.
"Ad Serving with RealSystem™ G2," RealNetworks, 1999, 38 pages, [online] [Retrieved on Feb. 13, 2009] Retrieved from the internet <URL:http://service.real.com/help/library/blueprints/adserve/adserve.htm>.
"www.Scanscout.com," 2 pages, Archived on Apr. 7, 2007 on web.archive.org [online][Tretived on Oct. 19, 2009] Retrived from the internet: <URL:http://web.archive.org/web/20070407233129/http://www.scanscout.com/>.
"www.BrightRoll.com," 2 pages, Archived on Apr. 29, 2007 on web.archive.org [online] [Retrieved on Oct. 19, 2009] Retrieved from the internet: <URL:http://web.archive.org/web/20070429110654/http://www.birghtroll.com/>.
AJAX Activity Indicators, Archived on Dec. 25, 2006 on www.web.archive.org [online] [Retrieved on Jun. 10, 2008] Retrieved from the internet <URL:http://web.archive.org/web/20061225134638/http://www/napyfab.com/ajax-indicators/>.
Strange, Adario, "VideoEgg Exec: YouTube's New Ads are Just Like Ours," [online], [Retrieved Jun. 2008, pp. 1-8,] Retrieved from the internet <URL://http://blog.wired.com/business/2007/08/network-wars-vi.html>.
"Overlay & Video AdType," ScanScout, 2007, [online] [Retrieved on Jul. 15, 2008] Retrieved from the internet <URL://demo.scanscount.com/livedemo.shtml?adType=overlay&videoAdType=right Side&ss . . . >.
Riley, D., "Contextual In-Video Advertising: ScanScout," May 14, 2007, [online] [Retrieved on Jul. 15, 2008] Retrieved from the internet <URL://www.techcrunch.com/2007/05/14/contextual-in-video-advertising-scanscout/.>
Delaney, Kevin J., "Start-Ups See to Cash In on Web-Video Ads", Wall Street Journal, Mar. 2, 2007,[online] [Retrieved Sep. 3, 2008] Retrieved from the internet <URL://www.scanscout.com/wsj-070302.html]>
"www.YuMe.com," 2009, 1 page, [online][Retrieved on Oct. 19, 2009] Retrieved from the internet: <URL:http://www.yume.com/>.
AdForce, Inc., A Complete Guide to AdForce, Version 2.6, 1998.
Dedrick, R., A Consumption Model for Targeted Electronic Advertising, Intel Architecture Labs, IEEE, 1995.
Dedrick, R., Interactive Electronic Advertising, IEEE, Jun. 6, 1994.
Information Access Technologies, Inc., Aaddzz brochure, "The Best Way to Buy and Sell Web Advertising Space," ©1997.
Request for Reexamination of U.S. Patent No. 6,829,587 B2, U.S. Appl. No. 95/001,068, Jul. 7, 2008.
Request for Reexamination of U.S. Patent No. 6,446,045 131, U.S. Appl. No. 95/001,061, Jul. 14, 2008.
Request for Reexamination of U.S. Patent 7,240,025 B2, U.S. Appl. No. 95/001,073, Jul. 30, 2008.
Request for Reexamination of U.S. Patent 7,249,059 132, U.S. Appl. No. 95/001,069, Jul. 21, 2008.
Zeff, R., et al., Advertising on the Internet, 2nd Ed., John Wiley & Sons, 1999.

* cited by examiner

SELECTION OF ADVERTISEMENTS FOR PLACEMENT WITH CONTENT

RELATED APPLICATIONS

This application claims the benefit under 35 U.S.C. §119 of U.S. patent application Ser. No. 60/946,702, titled "Selection of Advertisements for Placement with Content," filed Jun. 27, 2007, which is incorporated by reference herein in its entirety.

BACKGROUND

The subject matter of this specification relates generally to advertising.

Online video is a growing medium. The popularity of online video services reflects this growth. Advertisers see online video as another way to reach their customers. Many advertisers are interested in maximizing the number of actions (e.g., impressions and/or click-throughs) for their advertisements. To achieve this, advertisers make efforts to place advertisements with content that is relevant to their advertisements. For example, an advertiser can target its car advertisements to a website about cars.

SUMMARY

In general, one aspect of the subject matter described in this specification can be embodied in methods that include the actions of receiving a request for sponsored content for presentation with a content item, where the content item is included in a document; identifying one or more candidate sponsored content items based on a plurality of criteria, which includes information related to the content item independent of the document and information related to the document; selecting one or more of the candidate sponsored content items; and transmitting the selected sponsored content items for presentation with the content item. Other embodiments of this aspect include corresponding systems, apparatus, and computer program products.

In general, another aspect of the subject matter described in this specification can be embodied in methods that include the actions of receiving a request for sponsored content for presentation with a content item, where the content item is included in a presentation environment; identifying one or more candidate sponsored content items based on a plurality of criteria, which includes information related to the content item and information related to the presentation environment; selecting one or more of the candidate sponsored content items; transmitting the selected sponsored content items for presentation with the content item in the presentation environment. Other embodiments of this aspect include corresponding systems, apparatus, and computer program products.

Particular embodiments of the subject matter described in this specification can be implemented to realize one or more of the following advantages. Advertisements can be placed for presentation with third party video content. The placed advertisements are selected for relevance to video content, content of a page in which the video is embedded, and other related content. Advertisers can automatically and dynamically target embedded video content that may change over time.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
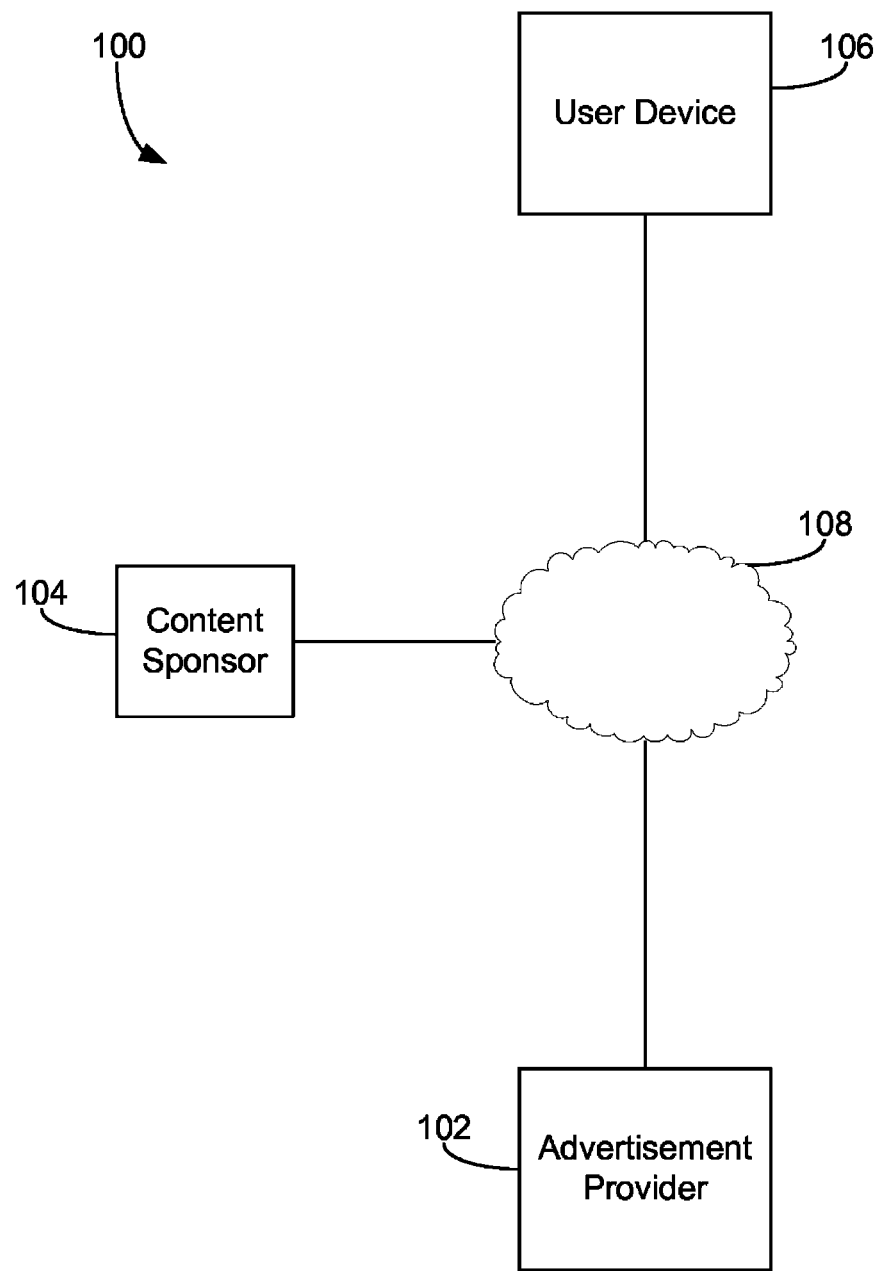
FIG. 1 is a block diagram illustrating an example network environment.

FIG. 1 shows an example of a network environment 100. The environment 100 includes a sponsored content (e.g., advertisement) provider 102, a content sponsor (e.g., provider) 104, and one or more user devices 106, at least some of which communicate across network 108. By way of example, discussion provided herein will make reference to the delivery of advertisements to a content provider. Other forms of sponsored content are possible. In some implementations, the advertisement provider 102 can provide advertising content (e.g., advertisements or "ads" or "ad" in the singular) for presentation with content items (e.g., text, images, video, audio, games, multimedia playlists (such as static, dynamic or executable lists of multiple content items to be played), embedded executables or software) provided by the content provider 104. For example, a video can be provided by the content provider 104 through the network 108 to one or more user devices 106. The ad content can be distributed, through network 108, to one or more user devices 106 before, during, or after presentation of the video. In some implementations, advertisement provider 102 is coupled with one or more advertising repositories (not shown). The repositories store advertising that can be presented with various types of content items, including video and audio.

In some implementations, the environment 100 can be used to identify relevant advertising content based on the content of the content item and perhaps other criteria. For example, the advertisement provider 102 can acquire information about the subject matter of a video, such as by reading video metadata that includes keywords that describe the subject matter of the video, and/or analyzing speech in the video, and/or analyzing the visual content of the video, for example. The information can be used to identify relevant advertisements, from which one or more are selected for presentation with the video.

In some implementations, content items can include various forms of electronic media. For example, a content item can include text, audio, video, advertisements, configuration parameters, documents, video files published on the Internet, television programs, audio podcasts, video podcasts, live or recorded talk shows, video voicemail, segments of a video conversation, and other distributable resources.

In some implementations, a "video content item" is an item of content that includes content that can be perceived visually when played, rendered, or decoded. A video includes video data, and optionally audio data, executable code, hyperlinks, and metadata. Video data includes content in the video that can be perceived visually when the video content item is played, rendered, or decoded. Audio data includes content in the video that can be perceived aurally when the video content item is played, decoded, or rendered. Executable code includes, for example, interactive ADOBE FLASH, JavaScript, or other forms of interactive content. Hyperlinks include, for example, links embedded in or associated with the video or executable code that provide an address link, such as a Uniform Resource Locator (URL), to other content or executable code. A video can include video data and any accompanying audio data regardless of whether or not the video is ultimately stored on a tangible medium. A video can include, for example, a live or recorded television program, a live or recorded theatrical or dramatic work, a music video, a televised event (e.g., a sports event, a political event, a news event, etc.), video voicemail, etc. Video, audio or other content items can also be part of a media playlist.

A video content item can also include many types of associated data or metadata. Metadata includes, for example, tags, labels, keywords, time stamps, XML-enclosed data, or other non-displayed information about the content. Examples of types of associated data include video data, audio data, closed-caption or subtitle data, a transcript, content descriptions (e.g., title, actor list, genre information, first performance or release date, etc.), related still images, user-supplied or provider-provided tags and ratings, etc. Some of this data, such as the description, can refer to the entire video content item, while other data (e.g., the closed-caption data) may be temporally-based or timecoded. In some implementations, the temporally-based data may be used to detect scene or content changes to determine relevant portions of that data for targeting ad content to users. The executable code and/or metadata may include interactive playlists of media content, such as lists of video, audio, web links, or other content types.

In some implementations, a video content item has one or more interstitial advertisement slots. One or more video advertisements can be presented in between the portions of the video separated by an advertisement slot, similar to television advertising commercials that are presented between portions of a television program. The positions of the advertisement slots can be specified by metadata associated with the video and stored at the video provider 209. The positions of the slots can be manually specified by the author of the video or automatically determined based on an analysis of the video. An example technique for analyzing a video to determine positions of advertisement slots is disclosed in U.S. patent application Ser. No. 11/737,038, titled "Characterizing Content for Identification of Advertising," filed Apr. 18, 2007, which is incorporated by reference in its entirety herein. Further details related to advertisement slots are disclosed in U.S. patent application Ser. No. 11/550,388, titled "Using Viewing Signals in Targeted Video Advertising," filed Oct. 17, 2006, which is incorporated by reference in its entirety herein.

In some implementations, an "audio content item" is an item of content that can be perceived aurally when played, rendered, or decoded. An audio content item includes audio data and optionally metadata. The audio data includes content in the audio content item that can be perceived aurally when the video content item is played, decoded, or rendered. An audio content item may include audio data regardless of whether or not the audio content item is ultimately stored on a tangible medium. An audio content item may include, for example, a live or recorded radio program, a live or recorded theatrical or dramatic work, a musical performance, a sound recording, a televised event (e.g., a sports event, a political event, a news event, etc.), voicemail, etc. Each of different forms or formats of the audio data (e.g., original, compressed, packetized, streamed, etc.) may be considered to be an audio content item (e.g., the same audio content item, or different audio content items).

Advertising content can include text, graphics, video, audio, banners, links, executable code and scripts, and other web or television programming related data. As such, ad content can be formatted differently, based on whether it is primarily directed to websites, media players, email, television programs, closed captioning, etc. For example, ad content directed to a website may be formatted for display in a frame within a web browser. As another example, ad content directed to a video player may be presented "in-stream" as a video content item is played in the video player. In some implementations, in-stream ad content may replace the video content item in a video player for some period of time or inserted between portions of the video content item. An in-stream ad can be pre-roll (before the video content item), post-roll (after the video content item), or interstitial. An in-stream ad may include video, audio, text, animated images, still images, or some combination thereof. The advertisement can appear in the same form as video content, as an overlay over video content, or in other forms. Examples of forms of advertisements for video that can be used with the implementations described in this specification are disclosed in U.S. Provisional Application No. 60/915,654, entitled "User Interfaces For Web-Based Video Player," filed May 2, 2007; and U.S. patent application Ser. No. 11/760,709, entitled "Systems and Processes for Presenting Informational Content," filed Jun. 8, 2007, which are incorporated by reference in their entirety herein.

The content provider 104 can present content to a user device 106 through the network 108. In some implementations, the content providers 104 are web servers where the content includes webpages or other content written in the Hypertext Markup Language (HTML), or any language suitable for authoring webpages. In general, content provider 104 can include users, web publishers, and other entities capable of distributing content over a network. In some implementations, the content provider 104 may make the content accessible through a known URL.

The content provider 104 can receive requests for content (e.g., articles, discussion threads, music, audio, video, graphics, search results, webpage listings, etc.). The content provider 104 can retrieve the requested content in response to the request or service the request in some other way. The advertisement provider 102 can broadcast content as well (e.g., not necessarily responsive to a request).

Content provided by content provider 104 can include news, weather, entertainment, or other consumable textual, audio, video, game, or multimedia content. More particularly, the content can include various resources, such as documents (e.g., webpages, plain text documents, dynamic network applications provided to the user on-the-fly, Portable Document Format (PDF) documents, images), video or audio clips, etc. In some implementations, the content can be graphic-intensive, media-rich data, such as, for example, FLASH-based content that presents video and audio, Asynchronous JavaScript and XML (AJAX) based web applications or web pages, and the like.

The content provider 104 can provide video content items for presentation to a user. The content provider 104 can provide a video content item as a stream or as a downloadable file to a user device 106. The content provider 104 can also provide a video player module with a video. In some implementations, a content item (e.g., a video content item, an audio content item) and a player module from the content provider 104 is embedded into a document (e.g., a webpage provided by content provider 104). The document includes the player module and a reference to the video or audio content item. The document can be sent to a user device 106. At the user device 106, the embedded player module can retrieve the referenced video or audio content item for playback at the user device 106. The player can provide a one or more pieces of content, such as via a playlist.

In some implementations, a document and a content item embedded in the documents are provided by different content providers. In an example implementation, a video from a first content provider is embedded in a document (e.g., a webpage) from a second content provider. The document includes a location (e.g., a URL) of the video at the first content provider. When the document is rendered at the user device 106, the video can be obtained from the second content provider and played back at the user device 106.

The environment 100 includes one or more user devices 106. The user device 106 can include a desktop computer, laptop computer, a media player (e.g., an MP3 player, a streaming audio player, a streaming video player, a television, a computer, a mobile device, etc.), a mobile phone, a browser facility (e.g., a web browser application), an e-mail facility, telephony means, a set top box, a television device or other electronic device that can access advertisements and other content via network 108. The content provider 104 may allow user device 106 to access content (e.g., webpages, videos, etc.).

The network 108 facilitates wireless or wireline communication between the advertisement provider 102, the content provider 104, and any other local or remote computers (e.g., user device 106). The network 108 may be all or a portion of an enterprise or secured network. In another example, the network 108 may be a virtual private network (VPN) between the content provider 104 and the user device 106 across a wireline or a wireless link. While illustrated as a single or continuous network, the network 108 may be logically divided into various sub-nets or virtual networks without departing from the scope of this disclosure, so long as at least a portion of the network 108 may facilitate communications between the advertisement provider 102, content provider 104, and at least one client (e.g., user device 106). In certain implementations, the network 108 may be a secure network associated with the enterprise and certain local or remote clients 106.

Examples of network 108 include a local area network (LAN), a wide area network (WAN), a wireless phone network, a Wi-Fi network, and the Internet.

In some implementations, the content provider 104 may transmit information about how, when, and/or where the ads are to be rendered, and/or information about the results of that rendering (e.g., ad spot, specified segment, position, selection or not, impression time, impression date, size, temporal length, volume, conversion or not, etc.) back to the advertisement provider 102 through the network 108. Alternatively, or in addition, such information may be provided back to the advertisement provider 102 by some other means.

Figure 2:
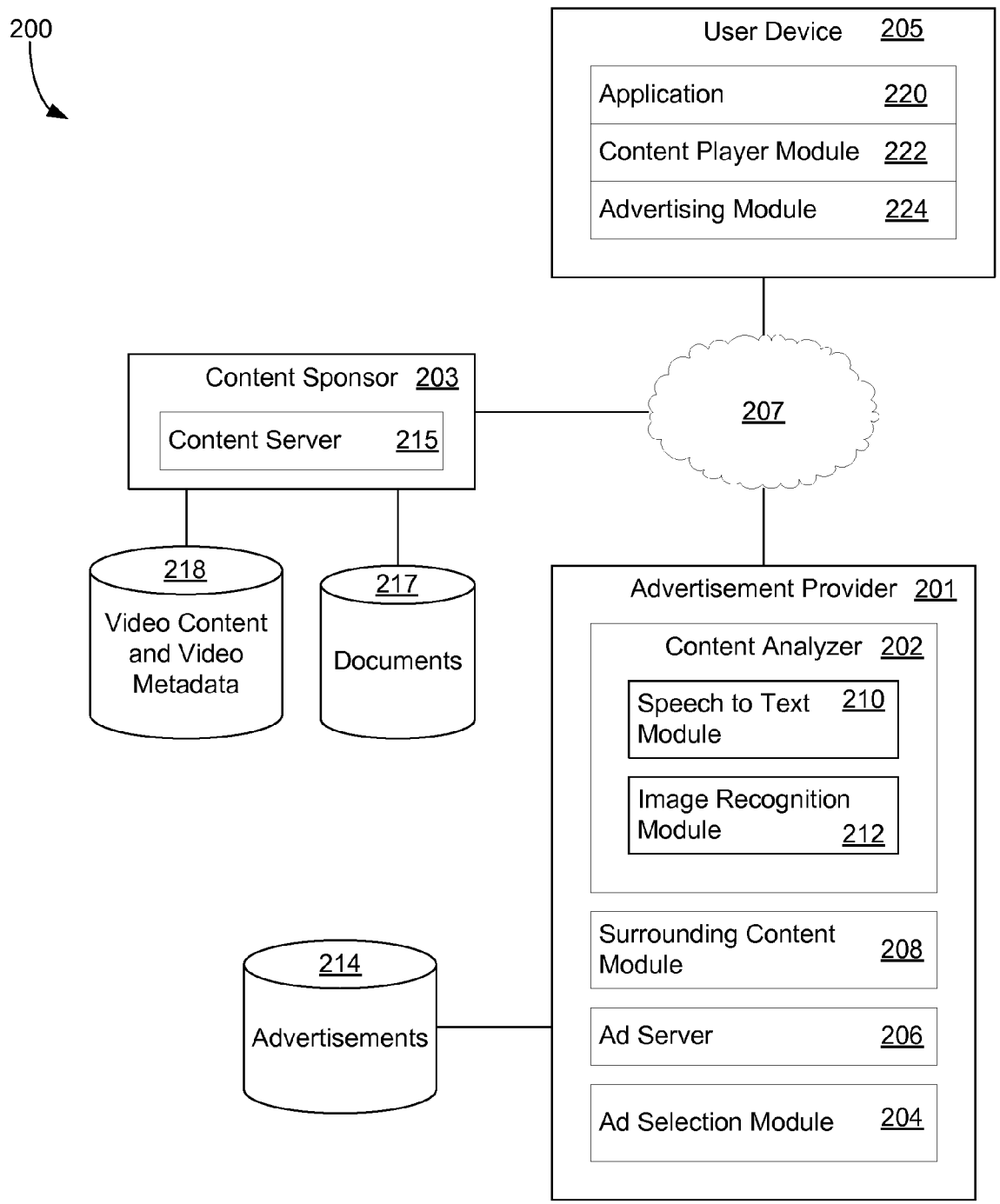
FIG. 2 is a block diagram illustrating an example advertising delivery system.

FIG. 2 is a block diagram illustrating an example advertising delivery system 200. System 200 includes, or is communicatively coupled with, advertisement provider 201, content provider 203, and user device 205, at least some of which communicate across network 207. In some implementations, the advertisement delivery system 200 is an example implementation of the network environment 100, where advertisement provider 201 is an implementation of advertisement provider 102, content provider 203 is an implementation of content provider 104, user device 205 is an implementation of user device 106, and network 207 is an implementation of network 108.

In some implementations, the advertisement provider 201 includes a content analyzer 202, an ad selection module 204, an ad server 206, and a surrounding content module 208. The content analyzer 202 can analyze received content items (e.g., videos) to determine one or more targeting criteria for content items. For example, the content analyzer 202 may implement various analysis methods, including, but not limited to weighting schemes, speech processing, image or object recognition, and statistical methods.

Analysis methods can be applied to the contextual elements of the received content item (e.g., a video, an audio clip) to determine relevant targeting criteria. For example, the received content can undergo one or more of audio volume normalization, automatic speech recognition, transcoding, indexing, image recognition, etc. In some implementations, the content analyzer 202 includes a speech to text module 210 and an image recognition module 212. Other modules are possible.

The speech to text module 210 can analyze a video to identify speech in a video or audio file or stream. For example, a video content item may be received in the system 200. The speech-to-text module 210 can analyze the video content item as a whole. Textual information may be derived from the speech included in the audio data of the video or audio content item by performing speech recognition on the audio content, producing in some implementations hypothesized words annotated with confidence scores, or in other implementations a lattice which contains many hypotheses. Examples of speech recognition techniques include techniques based on hidden Markov models, dynamic programming, or neural networks.

In some implementations, the speech analysis may include identifying phonemes, converting the phonemes to text, interpreting the phonemes as words or word combinations, and providing a representation of the words, and/or word combinations, which best corresponds with the received input speech (e.g., speech in the audio data of a video content item). The text can be further processed to determine the subject matter of the video or audio content item. For example, keyword spotting (e.g., word or utterance recognition), pattern recognition (e.g., defining noise ratios, sound lengths, etc.), or structural pattern recognition (e.g., syntactic patterns, grammar, graphical patterns, etc.) may be used to determine the subject matter, including different segments, of the video content item. In some implementations, further processing may be carried out on the video or audio content item to refine the identification of subject matter in the video or audio content item.

A video or audio content item can also include timecoded metadata. Examples of timecoded metadata include closed-captions, subtitles, or transcript data that includes a textual representation of the speech or dialogue in the video or audio content item. In some implementations, a caption data module (not shown) at the advertisement provider 201 extracts the textual representation from the closed-caption, subtitle, or transcript data of the content item and used the extracted text to identify subject matter in the video or audio content item. The extracted text can be a supplement to or a substitute for a speech recognition analysis on the video or audio content item.

Further processing of received content can also include image or object recognition. For example, automatic object recognition can be applied to received or acquired video data of a video content item to determine targeting criteria for one or more objects associated with the video content item. For example, the image recognition module 212 may automatically extract still frames from a video content item for analysis. The analysis may identify targeting criteria relevant to objects identified by the analysis. The analysis may also identify changes between sequential frames of the video content item that may be indicia of different scenes (e.g., fading to black). Examples of object recognition techniques include appearance-based object recognition, and object recognition based on local features. An example of object recognition is disclosed in U.S. patent application Ser. No. 11/608,219, entitled "Image Based Contextual Advertisement Method and Branded Barcodes," filed Dec. 7, 2006, which is incorporated by reference in its entirety herein.

The surrounding content module 208 reads content that is in proximity to (e.g., surrounds) an embedded content item. In implementations where a video or audio content item is embedded in a document, the surrounding content module 208 reads the content that surrounds the embedded content item, i.e. the content of the document other than the video itself. The surrounding content can be matched against advertisements to identify advertisements that have some subject matter relevance to the document, for example.

Advertisement provider 201 includes an ad selection module 204. In some implementations, the ad selection module 204 identifies, for a presentation of a content item, candidate advertisements and selects one or more of these candidate advertisements for presentation with the content item. The ad selection module 204 can identify the candidate advertisements based on multiple criteria, including advertiser preferences, content provider preferences, the content of the video, and content surrounding or in proximity to the video. From these candidate advertisements, one or more are selected for presentation with the video. In some implementations, advertisements are selected for presentation, in accordance with an auction. Further details on the identification of candidate advertisements and selection of advertisements are described below in reference to FIG. 5.

Advertisement provider 201 includes an ad server 206. Ad server 206 may directly, or indirectly, enter, maintain, and track ad information. The ads may be in the form of graphical ads such as so-called banner ads, text only ads, image ads, audio ads, video ads, ads combining one of more of any of such components, etc. The ads may also include embedded information, such as a link, and/or machine executable instructions. In some implementations, metadata can be associated with an advertisement. In some implementations, the metadata can include one or more keywords indicating topics or concepts to which the advertisement is relevant or other information that indicates the subject matter of the advertisement. In some implementations, the advertiser specifies one or more keywords that express the subject matter of the advertisement or one or more categories or verticals to which the advertisement is targeted.

Ad server 206 can receive requests for advertisements from a user device 205. In response to these requests, the ad server 206 can transmit selected advertisements to the user device 205. Further, the ad server 206 can receive usage information (e.g., advertisement click-through information) from the user device 205. Although not shown, other entities may provide usage information (e.g., whether or not a conversion or selection related to the ad occurred) to the ad server 206. For example, this usage information may include measured or observed user behavior related to ads that have been served. In some implementations, usage information can be measured in a privacy-preserving manner such that individually user identifiable information is filtered by the ad server, by the user device, or through an intermediary device.

The ad server 206 may include information concerning accounts, campaigns, creatives, targeting, advertiser preferences for ad placement, etc. The term "account" relates to information for a given advertiser (e.g., a unique email address, a password, billing information, etc.). A "campaign," "advertising campaign," or "ad campaign" refers to one or more groups of one or more advertisements, and may include a start date, an end date, budget information, targeting information, syndication information, etc.

The advertisement provider 201 can use one or more advertisement repositories 214 for selecting ads for presentation to a user. The repositories 214 may include any memory or database module and may take the form of volatile or non-volatile memory including, without limitation, magnetic media, optical media, random access memory (RAM), read-only memory (ROM), removable media, or any other suitable local or remote memory component.

The content provider 203 includes a content server 215. The content server 215 can serve various types of content, including documents, video content items, and audio content items, for example. In some implementations, the content server 215 can serve documents that have other content (e.g., video or audio content items from the content provider 203 or another content provider) embedded within. The content that can be served by the content server 215 is stored in a content repository. In some implementations, different types of content can be stored in separate repositories. For example, documents can be stored in a document repository 217, and video content items and metadata associated with the video content items can be stored in a video content repository 218. In an exemplary implementation, video metadata is written using the Extensible Markup Language (XML).

In some implementations, the content server 215 serves video content items, such as video streams or video files, for example. Video player applications may be used to render video streams or files. Ads may be served by the ad server 206 in association with video content items. For example, one or more ads may be served before, during, or after a music video, program, program segment, etc. Alternatively, one or more ads may be served in association with a music video, program, program segment, etc. The videos that can be served by the content server 215 are stored in a videos and video metadata repository 218. In some implementations, the content provider 203 also provides access to documents (e.g., a webpage) that include information (e.g., subject matter and categories of the videos) about the videos in the video repository 218.

While FIG. 2 is illustrated as having one content provider providing both documents and content items (e.g., video content items), in some implementations, separate content providers, with different content servers, provide documents and content items, respectively. For example, a first content provider can provide document retrieved from a document repository, where the documents include references to content items (e.g., video or audio content items) stored in a content item repository and served by a second content server.

In operation, the advertisement provider 201 and the content provider 203 can provide content to a user device 205. The user device 205 is an example of an ad consumer. The user device 205 may include a user device such as a media player (e.g., an MP3 player, a streaming audio player, a streaming video player, a television, a computer, a mobile device, etc.), a browser facility, an e-mail facility, telephony means, etc.

The user device 205 includes an application 220 for rendering and presenting content and advertisements. In some implementations, the application is a web browser that can render and display documents (e.g., webpages) and other content. In an exemplary implementation, one or more plug-ins can be associated with the application. The plug-ins can facilitate rendering and presentation of content (e.g., video or audio content items) or advertisements by the application 220.

The user device 205 includes a content player module 222 and an advertising module 224. The content player module 222 can play back content items, such as video or audio content items, for example. In some implementations, the content player module 222 is embedded in a document (e.g., a webpage), and received by the user device 205 when the document is received by the user device 205. When the document is rendered by the application 220, the content player module 222 is executed by the application 220 or a plug-in to the application 220.

The advertising module 224 sends requests for advertisements to the advertising provider 201 and receives advertisements responsive to the requests from the advertising provider 201. The advertising module 224 can provide the advertisements to the application 220 or the content player module 222 for presentation to the user. In some implementations, the advertising module 224 is a sub-module of the content player module 222.

Figure 3:
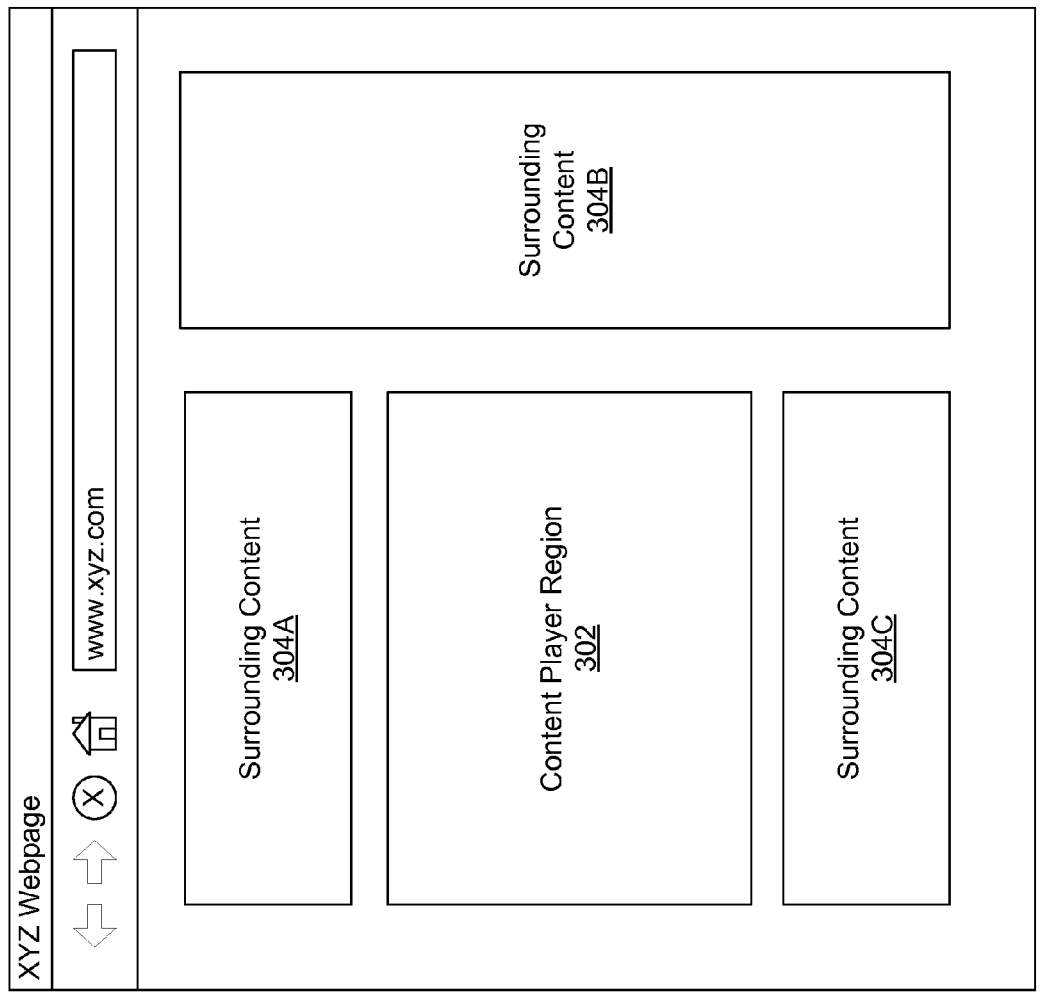
FIGS. 3-4 are examples of a user interface illustrating advertising content displayed on a screen with video content.

FIG. 3 is an example user interface 300 illustrating video content displayed on a screen with surrounding content. The user interface 300 illustrates an example web browser user interface. However, the content shown in the user interface 300 can be presented in a webpage, an MP3 player, a streaming audio player, a streaming video player, a television, a computer, a mobile device, etc. The content shown in the user interface 300 may be provided by advertisement provider 201, content provider 203, another networked device, or some combination of those providers.

As shown, the user interface 300 includes a content player region 302 and one or more "surrounding content" regions 304A, 304B, and 304C. The content player region 302 may include a media player for presenting text, images, video, or audio, or any combination thereof. An example of what can be shown in the content player region 302 is described in further detail below in relation to FIG. 4.

The surrounding content regions 304A, 304B, and 304C can display text, graphics, links, third party add-ins (e.g., search controls, download buttons, etc.), video and audio clips (e.g., graphics), help instructions (e.g., text, html, pop-up controls, etc.), and advertisements (e.g., banner ads, flash-based video/audio ads, scrolling ads, etc.). In some implementations, the surrounding content regions 304A, 304B, and 304C are portions of a webpage in which the content player is embedded.

The surrounding content may be related to the content displayed in the content player region 302. For example, advertisements related to the content in the content player region 302 can be displayed in any of the surrounding content regions 304A, 304B, 304C. As another example, the content in the content player region 302 is chosen for display with the surrounding content because they are related in subject matter (e.g., a video and a video player embedded with a posting in a blog). In some other implementations, the surrounding content is not related to the content in the content player region 302.

The surrounding content regions 304A, 304B, and 304C may be in proximity to the content player region 302 during the presentation of video content in the region 302. For example, the surrounding content regions 304A, 304B, and 304C can be adjacent to the content player region 302, either above, below, or to the side of the content player region 302. For example, the user interface 300 may include an add-on, such as a stock ticker with text advertisements. The stock ticker can be presented in one of the surrounding content regions 304A, 304B, or 304C.

Figure 4:
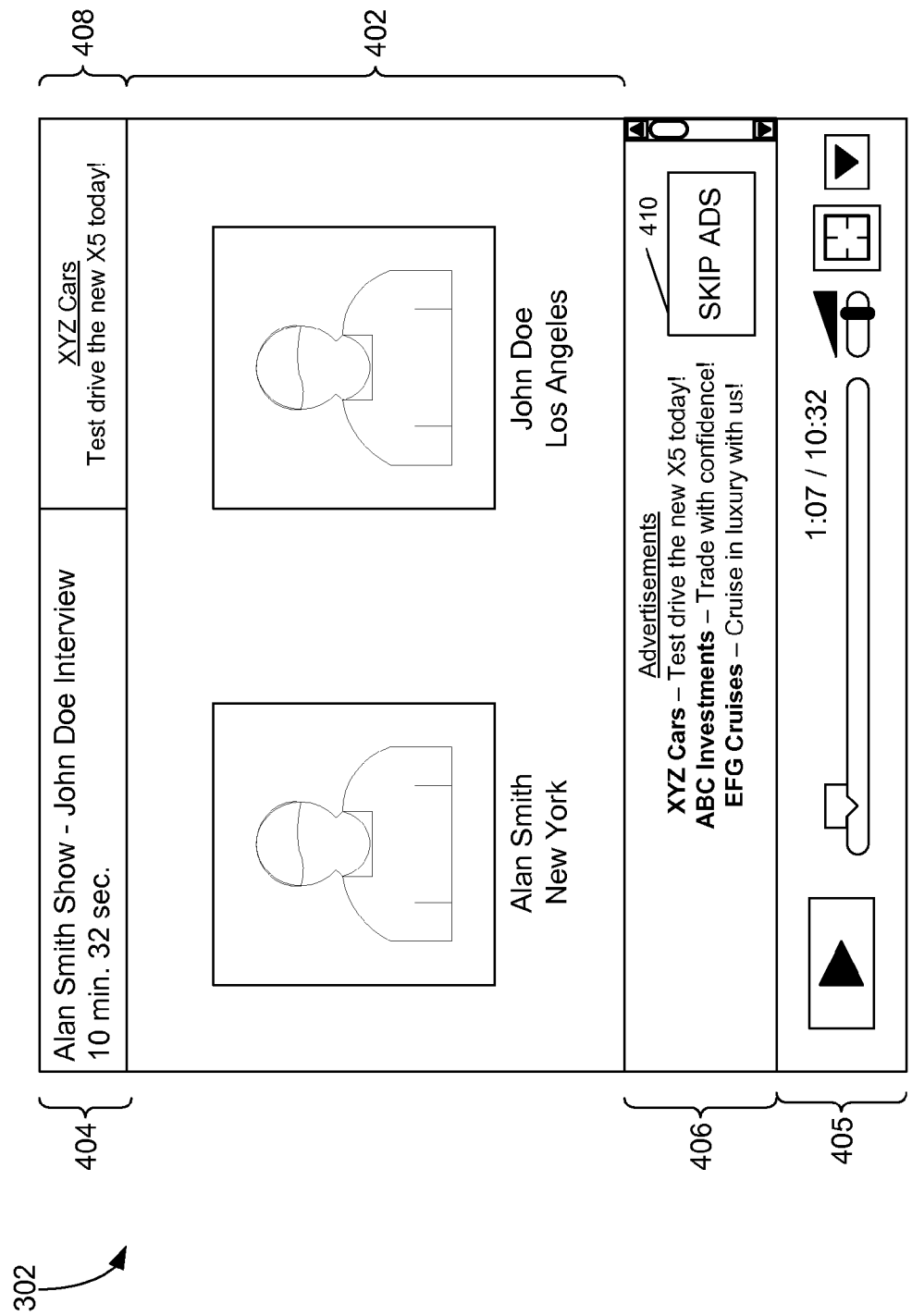

FIG. 4 illustrates an example user interface that can be displayed in a video player, such as in content player region 302. Content items, such as video, audio, and so forth can be displayed in the content player region 302. The region 302 includes a content display portion 402 for displaying a content item, a portion 404 for displaying information (e.g., title, running time, etc.) about the content item, player controls 405 (e.g., volume adjustment, full-screen mode, play/pause button, progress bar and slider, option menu, etc.), an advertisement display portion 408, and a multi-purpose portion 406 that can be used to display various content (e.g., advertisements, closed-captions/subtitles/transcript of the content item, related links, etc.).

As shown, the content shown represents a video (or audio) interview occurring between a person located in New York City, N.Y. and a person located in Los Angeles, Calif. The interview is displayed in the content display portion 402 of the region 302.

The region 302 may be presented as a stream, upon visiting a particular site presenting the interview, or after the execution of a downloaded file containing the interview or a link to the interview. As such, the region 302 may display additional content (e.g., advertisement content) that relates to the content shown in the video interview. For example, the additional content may change according to what is displayed in the region 302. The additional content can be substantially available as content from the content provider 203 and/or the advertisement provider 201.

An on-screen advertisement is displayed in the multi-purpose portion 406. An additional on-screen advertisement is displayed in the advertisement display portion 408. In some implementations, on-screen advertisements may include text-and-audio, video, text, animated images, still images, or some combination thereof.

In some implementations, the content display portion 402 can display advertisements targeted to audio-only content, such as ads capable of being displayed in-stream with a podcast or web monitored radio broadcasts. For example, the advertisement provider 201 may provide interstitial advertisements, sound bytes, or news information in the audio stream of music or disc jockey conversations.

Advertisements may be presented on the content display portion 402. Temporal placement of advertisements relative to a video content item may vary. For example, an advertisement presentation may be pre-roll, mid-roll or post-roll placement.

In some implementations, the progress bar in the player controls 405 also shows the positions of the advertisement slots in the content item being played.

The multi-purpose portion 406 may also include a skip advertisement link or control 410. When the skip advertisement link 410 is selected by the user, the currently displayed video advertisement is skipped and playback continues from the first frame of the video after the skipped video advertisement (or, playback stops if the skipped video advertisement is a post-roll advertisement). In some implementations, the skip advertisement link or control 410 is a link. In some other implementations, the skip advertisement link or control 410 may be a button, selectable icon, or some other user-selectable user interface object.

In some implementations, the ability of a user to skip advertisements, for example, by using the skip advertisement link or control 410, may effect the selection of an advertisement to be presented by the advertisement provider 201. For example, a large number of skips for an advertisement may indicate that the advertisement is ineffective or unpopular, and thus can be made less likely to be selected for presentation (e.g., by decreasing its bid in a placement auction or being counted as a negative weighting factor in auctions or towards advertising impressions). Inversely, advertisements that are infrequently skipped may have a positive weighting factor and or have a positive impact toward advertising impressions.

Figure 5:
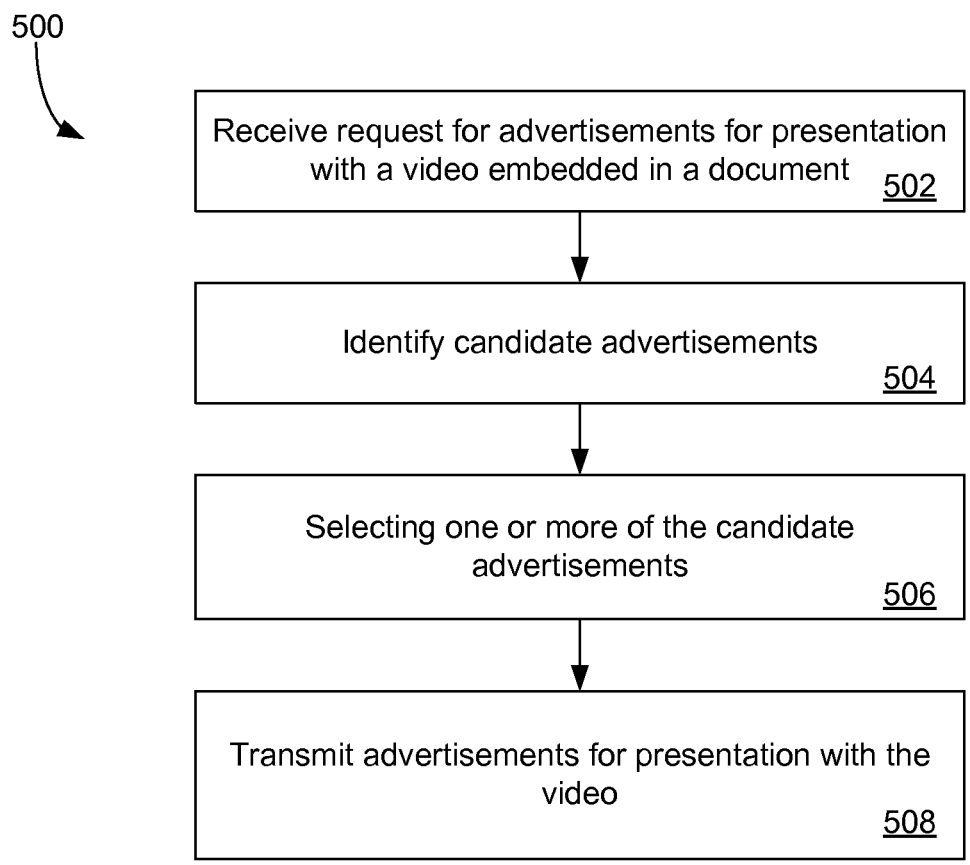
FIG. 5 is a flow diagram illustrating an example process for selecting and delivering advertisements.

FIG. 5 illustrates an example process 500 for selecting and delivering advertisements for presentation with a content item. For convenience, the process 500 will be described in reference to a system (e.g., system 200) that performs the process. For ease of explanation, process 500 will be described with reference to a video content item (e.g., a video stream or file), but it should be appreciated that process 500 is also applicable to other content items, such as audio content items, as well.

A request for one or more advertisements is received (502). In some implementations, a user device 205 can receive a document from a content provider 203. In some implementations, the document can include an embedded video content item (hereinafter referred to as the "video"), an embedded content player (e.g., content player module 222), and an advertising module (e.g., advertising module 224). The advertising module 224 sends a request for advertisements to the advertisement provider 201. The request can be for one or more advertisements for presentation with the video. In some implementations, the request can specify the type (e.g., computer, mobile phone, etc.) of the user device 205 that sent the request. For example, the request can specify that the user device is a desktop or notebook computer or a mobile phone.

The request can include metadata associated with the video. The metadata can specify preferences on what and how advertisements are presented with the video. The preferences can be set by the author of the video, the author of the document in which the video is embedded, or content provider 203 (hereinafter referred to collectively as "content provider preferences").

In some implementations, the content provider preferences specify the available positions in which video advertisements can be presented. For example, the metadata can specify that the video has two interstitial positions, a pre-roll position, and a post-roll position for advertisements, and that advertisements may be placed in any of these positions. As another example, the content provider preferences can specify that advertisements may be presented with the video only as post-roll advertisements, only as pre-roll advertisements before the video, only as interstitial advertisements between portions of the video, or some combination thereof (e.g., no interstitial advertisements=pre-roll or post-roll advertisements only).

The metadata can also include data that provides an indication of the content (e.g., the subject matter) of the video. For example, the metadata can include one or more keywords that specify topics or concepts to which the video is relevant. The metadata can include one or more categories or verticals (hereinafter referred as "channels") into which the video can be classified. The metadata can also include information referencing one or more playlists or playlist categories on which the content is placed or linked. The topical data or the channel data can be used by the advertisement provider 201 to identify advertisements that are relevant to the video. In some other implementations, the topical or channel information of the video can be determined by analyzing the video.

In some implementations, the metadata can specify other types of content provider preferences as well. For example, the metadata can specify whether video advertisements displayed with the video can be skipped or not. As another example, the metadata can also specify one or more target demographics for the video. As a further example, the metadata can specify the time lengths of advertisement placement positions, the maximum allowable advertisement duration, and/or which types of advertisements (e.g., text ads, overlay ads, banner ads, pop-up ads, video ads, etc.) are allowed. In some implementations, the preferences in the metadata include blacklisted keywords or advertisers. An advertisement associated with a blacklisted keyword or advertiser is automatically disqualified from consideration for placement with the video. In some implementations, an advertiser in the blacklist is specified by a name and/or a URL associated with the advertiser.

One or more candidate advertisements are identified (504). In some implementations, one or more advertisements from the advertisements repository 214 are identified by the ad selection module 204 to be candidates in an auction for placement with the video. In some implementations, the candidate advertisements are identified based on multiple criteria.

In some implementations, a criterion for identification of candidate advertisements is advertiser preferences. For an advertisement, an advertiser can set preferences related to the presentation and targeting of the advertisement. The preferences can include preferences related to presentation position (e.g., pre-roll, post-roll, interstitial), capability of being skipped by the user, target demographics, type of device, and so forth. In some implementations, the advertiser preferences are matched against the content provider preferences.

For example, the advertiser can specify a preference as to whether a video advertisement can be presented pre-roll, post-roll, or in an interstitial slot. The advertiser can specify a preference as to whether a user viewing a video advertisement can be given the capability to skip it. The advertiser can specify a preference as to the target demographics to which the advertisement may be shown. The advertiser can specify that the advertisement is best viewed on a desktop/notebook computer or a mobile phone. Other types of preferences are possible.

In some implementations, other characteristics of the advertisement can be matched against the content provider preferences. For example, the content provider preferences may include a maximum allowable time length per video ad. A video ad may be disqualified if its length is longer than the maximum time length. As another example, the content provider preferences may include restrictions on which types of ads are allowed. If the ad does not belong to one of the allowed types, the ad can be disqualified.

In some implementations, an advertiser preference can be an absolute preference or a relative preference. If a preference is an absolute preference and it is not satisfied by the video, then the advertisement is disqualified from the auction, regardless of satisfaction of other preferences and relevance of the advertisement to the video or the document. If the preference is a relative preference and it is not completely satisfied, then the advertisement may still be eligible for the auction, subject to other criteria, but the incomplete satisfaction of the preference can be used to modify a bid associated with the advertisement in the auction. The advertiser preferences can specify a bid modifier for a preference, in case that preference is not satisfied completely.

In some implementations, the preferences can include a channel to which the advertisement is targeted. An advertiser can target an advertisement to a particular channel. Examples of channels include "news videos" or "action movies." In some implementations, an advertisement targeted to a channel is identified as a candidate advertisement for auctions for placement with videos in that channel. However, an advertisement targeted to a channel can be disregarded with respect to a particular video in the channel if other advertiser preferences for the advertisement are not satisfied by the video. For example, an advertisement can be disregarded if the advertiser specified that the advertisement be presented only as a pre-roll ad but a video only allows interstitial and post-roll advertisements.

Yet another criterion for identifying candidate advertisements is the content (e.g., subject matter) of the video. The video can be associated with metadata specifying one or more topics or concepts. Alternatively, a document provided by the content provider (e.g., a webpage) can include topical or concept information for the video. The video can be retrieved by the advertisement provider 201 from the content provider 203 and analyzed by the content analyzer 202. One or more topics or concepts to which the video is relevant can be determined from the analysis. The content of the advertisement are compared against the topics or concepts of the video. In an example implementation, the topics or concepts of the video are compared to the topics and concepts of the advertisement. For example, the topical keywords of the video are compared to the topical keywords of the advertisement using, for example, keyword analysis, and a score can be determined from the comparison. If the score exceeds a threshold, for example, the advertisement can be identified as a candidate for the auction, pending satisfaction of other criteria, if any. Topics can also be determined from image, audio or video analysis.

In some implementations, the topical keywords for a video can be determined using search engine data. For example, data related to interactions to a video by users who were directed to the video by a search query (e.g., the video was a result for the search query) can be an indication of whether the search query is a good topical keyword for the video. Interactions with the video can include watching the video in its entirety, watching the video repeatedly, fast-forwarding or advancing the video, or skipping the video. A search engine can collect the query and interaction data anonymously and the advertisement provider 201 can analyze the data to determine if a search query is a good keyword for the video based on the interactions of the users. For example, if users who accessed a video through a search query tended to skip the video, then the search query can be determined to be a poor keyword for the video. On the other hand, if the users tend to watch the video over and over again, then search query can be determined to be a good keyword for the video. The good keywords are associated with the video and can be compared to the keywords for the advertisements.

In some implementations, an advertisement can target specific channels. A video can be analyzed to determine to which channel the video can be classified, or the channels to which the video can be classified can be specified in the video metadata. In other words, videos can be classified into channels based on the analysis of the videos, if no channels were pre-specified. If the targeted channels of the advertisement match any of the channels to which the video is classified, the advertisement is identified as a candidate for the auction, subject to satisfaction of other preferences (e.g., satisfaction of content provider preferences regarding placement position). Similarly, advertisements can target categories of playlists or individual playlists based on such categorization.

A further criterion for identifying candidate advertisements is the surrounding content around the embedded video. The surrounding content can include the content of the document in which the video is embedded. In some implementations, the surrounding content can also include the use profile of the owner of the document or the user viewing the video. For example, if a video is embedded in a person's page on a social networking site, the user profile of the person owning the page and/or the user profile of the user who is viewing the page and the video are surrounding content. The surrounding content module 208 can compare the surrounding content against the topics and concepts of the advertisement using, for example, keyword analysis, and a score can be determined from the comparison. If the score exceeds a threshold, for example, the advertisement can be identified as a candidate for the auction, pending satisfaction of other criteria, if any.

In some implementations, a "user profile" of a page owner or of a viewer of the video is demographic information associated with the respective user, such as age, gender, education, etc. Demographic information of a user can be extracted from the user's profile on a social networking site, for example. In some implementations, the demographic information can also be obtained from third parties. The demographic information can be obtained separate from any personally identifiable information.

In some implementations, a further criterion for identifying candidate advertisements is content of a page that links to the video. Hyperlinks to a video can be identified by a web crawler system. Content in the pages that contain the hyperlinks can be extracted. For example, the anchor text of a hyperlink and text content surrounding the hyperlink can be extracted. The extracted text can be compared to the topics and concepts of the advertisements, similar to the comparison of the surrounding content and the advertisement described above. In some implementations, the content from the linking page can be weighted higher if the linking page is a high-quality page based on inbound and outbound links, for example.

In some implementations, the page linking to the video or the page in which the video is embedded can be analyzed to determine if the content in the page is related specifically to the video or includes content related to other videos as well. For example, the page can be parsed in a structured way to identify components such as titles, particular blog posts, and so on. When identifying candidate advertisements for the video, content related to other videos can be weighted less or disregarded.

In some implementations, interaction data (e.g., skipping, fast-forwarding, watching multiple times, etc.) can be collected for users navigating to the video through the hyperlinks. The interaction data can be used to determine which hyperlinks and content related to the hyperlinks are more relevant to the video for use in advertisement selection.

In some implementations, another criterion is a text transcript of speech in the video generated by a speech recognition process applied to the video. The transcript can be a source of keywords for the video; keyword analysis can be applied to the transcript to identify keywords for the video.

In some implementations, the speech recognition process can also determine per-term confidence levels for terms in the transcript, where a term can include words, phrases, numbers, characters, etc. The per-term confidence levels measure a confidence of the speech recognition process that the corresponding terms were recognized correctly. The confidence levels can be used as weights for terms in the transcript. For example, for two terms in the transcript of approximately equal relevance to the video, the term with the higher confidence level is given more weight, and thus more influence, when matching advertisements to terms in the transcript. An example of using speech recognition, including confidence levels for terms, to identify advertisements relevant to content is disclosed in U.S. patent application Ser. No. 11/241,834, titled "Using Speech Recognition to Determine Advertisements Relevant to Audio Content and/or Audio Content Relevant to Advertisements," filed Sep. 30, 2005, which is incorporated by reference herein in its entirety.

In some implementations, the transcript can also be used to verify any publisher-provided metadata regarding the subject matter of the video. For example, the publisher of the video can declare in the video metadata that the video is about cars. If the transcript indicates that the video is about baseball (e.g., because the transcript has no mention of "cars"), the video and the publisher can be flagged for further manual review. If the manual review confirms that the video metadata does not accurately describe the subject matter of the video, the publisher can be penalized (e.g., banned from receiving advertisements from the advertisement provider 201, lesser penalties).

In some implementations, the comparison with the surrounding content is omitted if the advertisement targets particular channels of videos.

As an example of how both the content of the video and the surrounding content can affect the identification of candidate advertisements, consider a video about cars. If the video is embedded in a webpage about racing, then advertisements for racing cars or sports cars, for example, can be identified as candidate advertisements. If the video is embedded in a webpage about parenting, then advertisements for family friendly cars (e.g., minivans) or child safety seats, for example, can be identified as candidate advertisements. Advertisements for racing cars or sports cars would be less likely to be identified as candidate advertisements in the second scenario because of the difference in the surrounding content (webpage about parenting vs. webpage about racing). In some implementations, content that is not likely to be relevant to the content of a webpage can be excluded from the targeting.

In some implementations, an advertisement is compared against both the content of the video and of the surrounding content, and the comparisons are combined in a weighted manner. For example, the comparison between the topics of the advertisement and the topics of the video, as determined from an analysis of the video can yield one score, the comparison between the topics of the advertisement and the content of the document in which the video is embedded yields another score. Further, comparison to the user profile of the document owner and/or to the user profile of a user viewing the document can yield respective scores. Weights can be specified for each of these types of comparisons. In some implementations, the weights can be specified by the author or provider of the video or the owner or provider of the document in which the video is embedded. The weights can be specified per provider and/or per content item. The weights can serve as an indication of which comparison should play a larger role in affecting which advertisements are candidates.

In some implementations, the weights can be adjusted over time to optimize the weightings. For example, weights can be determined from experimentation and empirical analysis of performance of advertisements placed using different weights. As another example, a machine learning process can be used to analyze the advertisement performance and adjust weights without manual intervention.

The scores from the comparisons to the content of the video and of the surrounding content can be combined into a weighted score for the advertisement using, for example, a linear combination. An example linear combination is $S=\alpha A+\beta B+\delta C+\ldots$, where S is the weighted score, $\alpha$, $\beta$, and $\delta$ are the weights, and A, B, C are the scores determined from the individual comparisons. A weighted score S can be determined for an advertisement. If the weighted score exceeds a specified threshold, then the advertisement is identified as a candidate advertisement for the auction. Otherwise, the advertisement is disregarded or disqualified.

One or more of the candidate advertisements are selected (506). In some implementations, the identified candidate advertisements are placed into an auction for presentation with the video. Advertisers can enter bids using the ad server 206, for example. The bids can be cost-per-click (CPC) bids or cost-per-thousand impression (CPM) bids. In an example implementation, the CPM bid of an advertisement can converted to an estimate CPC bid by multiplying the CPM bid with a click-through rate of the advertisement. The advertisements in the auction are then ordered based on their actual or estimate CPC bids.

In some implementations, the advertiser can enter a base bid and any number of bid modifiers. An example of a bid modifier is a decrease of $0.50 from the bid if the video allows skipping of advertisements. Another example of a bid modifier is a decrease of $0.50 from the bid if the video does not allow pre-roll advertisements. These modifiers allow an advertiser to fine tune its bid based on the advertiser's value of an ad placement under various conditions.

A bid of an advertisement can also be modified by the advertisement provider 201 based on the performance or quality of the advertisement over time. In some implementations, quality measures of an advertisement can include a click-through rate, a conversion rate, a skip rate, the number of times the advertisement was viewed completely vs. the number of impressions, and so forth. Advertisements of low quality based on these measures can have their bids decreased. For example, if the advertisement has a high rate of being skipped by viewers and/or has a low conversion rate, the bid can be decreased.

The advertisements with the highest bids are selected by the ad selection module 204 to fill the available advertisement placement positions. Thus, for example, if there are three available positions (say, a pre-roll position for one ad, an interstitial slot for one ad, and a post-roll position for one ad), the three advertisements with the highest bids are selected for the positions. In an example implementation, the advertisements are placed into the positions in their bid order. Thus, for example, the advertisement with the highest bid is placed in the earliest position, the advertisement with the next highest bid is placed in the next position, and so forth.

In some other implementations, the bid order determines a priority as to which of the selected advertisements will get a desired position. For example, if there are a pre-roll position, an interstitial slot, and a post-roll position, a highest bidding advertisement that prefers an interstitial slot will get the interstitial slot, while the next advertisement in the bid order can be placed in a pre-roll or a post-roll position even if the advertisement also prefers an interstitial slot.

The selected advertisements are transmitted for presentation with the video (508). The ad server 206 transmits the advertisements to the user device 205. The advertisements are received by the advertising module 224 and are placed into their respective positions. The content player module 222 displays the advertisements at their respective positions. For example, the advertisements can be displayed in-stream with a video in the content display region 402 (FIG. 4).

In some implementations, after the advertisements are transmitted to the user device 205, the user response to the advertisements and the video can be monitored. For example, data on click-throughs of the advertisement, viewing of the respective advertisements in their entirety (or not), viewing of the video in its entirety, and skipping of the advertisements can be collected by the advertisement provider 201. The advertisement provider can use this data to determine the performance of the advertisements, for example. In an example implementation where the content provider participates in a revenue sharing scheme, the performance data can be used to determine the amount of revenue to which the content provider is entitled. An example of a revenue sharing scheme is disclosed in U.S. patent application Ser. No. 11/755,624, entitled "Flexible Revenue Sharing and Referral Bounty System," filed May 30, 2007, which is incorporated by reference in its entirety herein.

Further, the performance data can be used as a signal to adjust the weights of the scores of comparisons to the video and to the document or to adjust the bids of ads in an auction. For example, if the performance of an ad is good with respect to a particular video, the performance data can be used by the advertisement provider 201 to increase one or more weights with respect to the content provider of the video or with respect to the video. On the other hand, if the performance is poor, the weights can be decreased. As another example, the bid for a poor performing ad can be decreased, and the bid for a well performing ad can be increased.

In an example implementation of the process 500 described above, the identification of candidate advertisements begins, after receiving the request for advertisements, with the determination of advertisements that are relevant to the video and to the document based on comparisons to the video content and to the document content, as described above. An advertisement can be scored using a linear combination, for example, of the scores for the individual comparisons. For example, the score from the comparison to the video content can be weighted by a first weight to yield a first weighted score (e.g., $\alpha A$) and the comparison to the document can be weighted by a second weight to yield a second weighted score (e.g., $\beta B$). The two weighted scores are added to yield the score for the advertisement. Ads with scores above a threshold are identified as candidates for further consideration.

The identified advertisements are then filtered by matching them against the content provider preferences. For example, if the content provider preferences specify a desire for interstitial ads only, and each ad can be at most 30 seconds long, then ads targeted for a pre-roll or post-roll position or that are longer than 30 seconds can be disqualified. As another example, if the content provider preferences specify a desire for video ads only, then non-video ads are disqualified.

One or more of the non-disqualified ads are selected based on an auction, where each of the non-disqualified ads is associated with a bid. The ads with the top bids are selected, subject to length restrictions. For example, if the auction is for one interstitial slot of 1 minute long, and the ad with the high bid is 40 seconds long, then the remaining 20 seconds in the slot can be filled by an ad of 20-seconds or shorter with the next highest bid, or it can go unfilled if there are no 20-second ad in the auction. The ads selected from the auction are transmitted to the user device 205 for presentation to the user. Data on user responses to the advertisements and the video (e.g., click-throughs of the advertisement, viewing of the respective advertisements in their entirety, viewing of the video in its entirety, and skipping of the advertisements) can be collected. The collected data can be used by the advertising provider 201 to adjust the weights in the determination of relevant advertisements and/or adjust the bids of ads in auctions.

Figure 6:
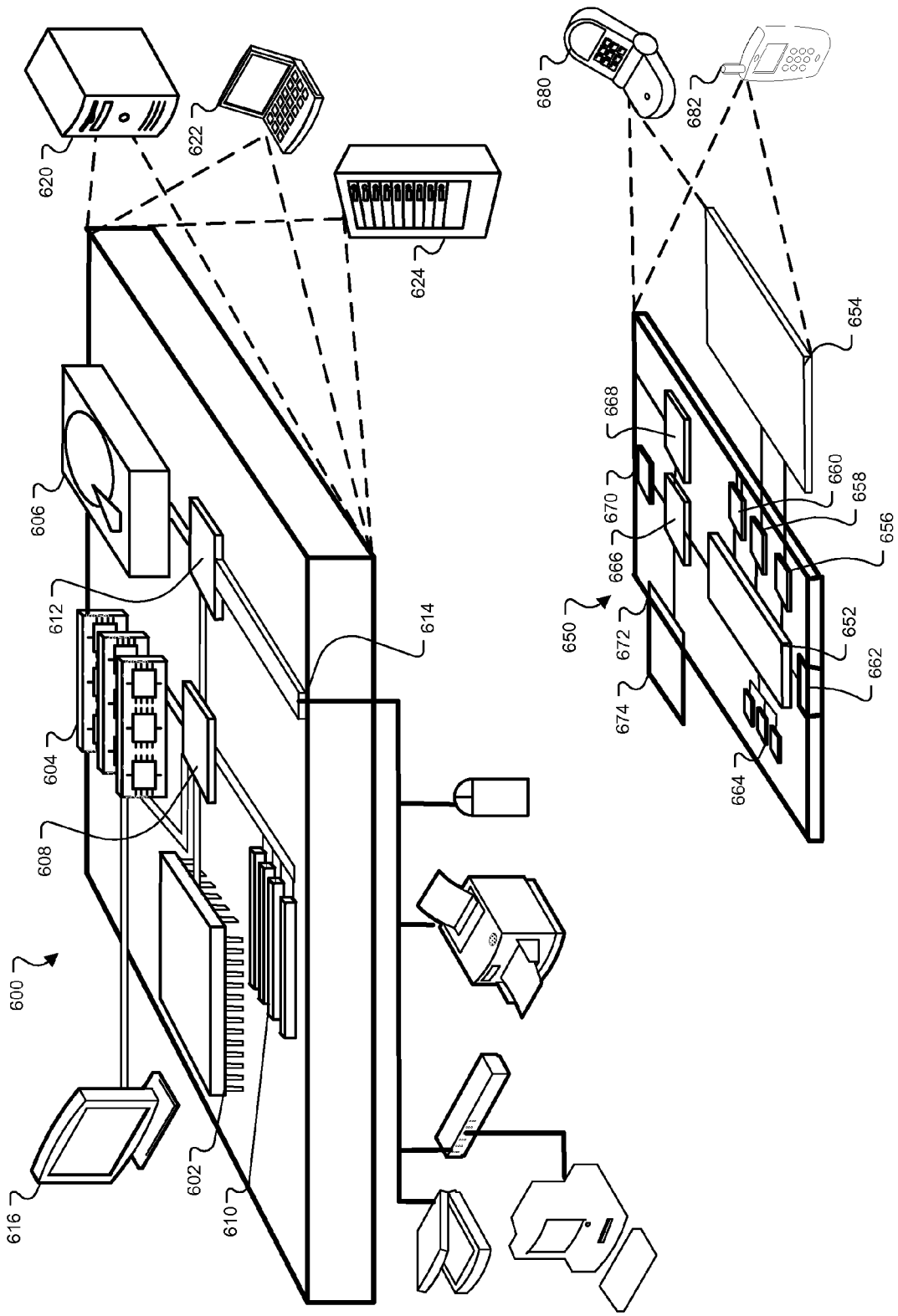
FIG. 6 is a block diagram illustrating an example generic computer and an example generic mobile computer device.

FIG. 6 shows an example of a generic computer device 600 and a generic mobile computer device 650, which may be used with the techniques described above. Computing device 600 is intended to represent various forms of digital computers, such as laptops, desktops, workstations, personal digital assistants, television set-top boxes, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit the implementations described and/or the claims.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various buses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

What is claimed is:

1. A computer-implemented method, the method comprising:

receiving a request for sponsored content for presentation with a multimedia content item, wherein the content item is included in a document;

selecting a plurality of keywords for the content item wherein a first keyword of the keywords is selected based on historical user interaction with the content item when the content item was provided as a search result responsive to a query comprising the first keyword, and wherein a second keyword of the keywords is selected based on analysis of the content item;

for each of one or more candidate sponsored content items:
calculating a respective first score based at least partially on a comparison of the candidate sponsored content item to one or more of the keywords;
calculating a respective second score based on, at least, a comparison of the candidate sponsored content item to content of the document and based on a profile of an owner of the document;
calculating a respective final score based on, at least, a weighted combination of the respective first and second scores in which the first and second scores are weighted differently, and in which a weight of the first or the second score is based at least partially on a measure of past user interactions with the candidate sponsored content item when the candidate sponsored content item was presented with the content item;

selecting one or more of the candidate sponsored content items based on, at least, the candidate sponsored content items' respective final scores; and providing the selected sponsored content items for presentation with the content item.

2. The method of claim 1, wherein the sponsored content items comprise one or more advertisements.

3. The method of claim 1, wherein the content item comprises a video file or stream.

4. The method of claim 1, wherein calculating one of the scores is further based on a user profile of a user accessing the document or the content item.

5. The method of claim 1, wherein calculating one of the scores is further based on metadata associated with the content item.

6. The method of claim 1, wherein calculating one of the scores is further based on content of a second different document that contains a hyperlink to the content item.

7. The method of claim 6, wherein the content of the second different document that contains the hyperlink to the content item comprises anchor text of the hyperlink.

8. The method of claim 1, wherein:
the content item includes audio data, and
wherein the analysis of the content item comprises a speech recognition analysis of the audio data.

9. The method of claim 8, wherein the speech recognition analysis of the audio data comprises a determination of a confidence level for each of one or more terms in the audio data.

10. The method of claim 1, wherein:
the content item includes visual data; and
wherein the analysis of the content item comprises an image recognition analysis of the visual data.

11. The method of claim 1, wherein selecting one or more of the candidate sponsored content items comprises selecting one or more of the candidate sponsored content items based on respective bids associated with the candidate sponsored content items.

12. A system comprising:
one or more processors; and
a storage device having instructions stored thereon which, when executed by the one or more processors, cause the one or more processors to perform operations comprising:
receive a request for sponsored content for presentation with a multimedia content item, wherein the content item is included in a document;
selecting a plurality of keywords for the content item wherein a first keyword of the keywords is selected based on historical user interaction with the content item when the content item was provided as a search result responsive to a query comprising the first keyword, and wherein a second keyword of the keywords is selected based on analysis of the content item;
for each of one or more candidate sponsored content items:
calculate a respective first score based at least partially on a comparison of the candidate sponsored content item to one or more of the keywords;
calculate a respective second score based on, at least, a comparison of the candidate sponsored content item to content of the document and based on a profile of an owner of the document;
calculate a respective final score based on, at least, a weighted combination of the respective first and second scores in which the first and second scores are weighted differently, and in which a weight of the first or the second score is based at least partially on a measure of past user interactions with the candidate sponsored content item when the candidate sponsored content item was presented with the content item;
select one or more of the candidate sponsored content items based on, at least, the candidate sponsored content item's respective final scores; and
provide the selected sponsored content items for presentation with the content item.

13. The system of claim 12 wherein the sponsored content items comprise one or more advertisements.

14. The system of claim 12 wherein the content item comprises a video file or stream.

15. The system of claim 12 wherein calculating one of the scores is further based on a user profile of a user accessing the document or the content item.

16. The system of claim 12 wherein calculating one of the scores is further based on metadata associated with the content item.

17. The system of claim 12 wherein calculating one of the scores is further based on content of a second different document that contains a hyperlink to the content item.

18. The system of claim 17 wherein the content of the second different document that contains the hyperlink to the content item comprises anchor text of the hyperlink.

19. The system of claim 12 wherein:
the content item includes audio data, and
wherein the analysis of the content item comprises a speech recognition analysis of the audio data.

20. The system of claim 19 wherein the speech recognition analysis of the audio data comprises a determination of a confidence level for each of one or more terms in the audio data.

21. The system of claim 12 wherein:
the content item includes visual data; and
wherein the analysis of the content item comprises an image recognition analysis of the visual data.

22. The system of claim 12 wherein selecting one or more of the candidate sponsored content items comprises selecting one or more of the candidate sponsored content items based on respective bids associated with the candidate sponsored content items.

23. One or more disk devices having instructions stored thereon which, when executed by a processor, cause the processor to perform operations comprising:
receiving a request for sponsored content for presentation with a content multimedia item, wherein the content item is included in a document;
selecting a plurality of keywords for the content item wherein a first keyword of the keywords is selected based on historical user interaction with the content item when the content item was provided as a search result responsive to a query comprising the first keyword, and wherein a second keyword of the keywords is selected based on analysis of the content item;
for each of one or more candidate sponsored content items:
calculating a respective first score based at least partially on a comparison of the candidate sponsored content item to one or more of the keywords;
calculating a respective second score based on, at least, a comparison of the candidate sponsored content item to content of the document and based on a profile of an owner of the document;
calculating a respective final score based on, at least, a weighted combination of the respective first and second scores in which the first and second scores are weighted differently, and in which a weight of the first or the second score is based at least partially on a measure of past user interactions with the candidate sponsored content item when the candidate sponsored content item was presented with the content item;

selecting one or more of the candidate sponsored content items based on, at least, the candidate sponsored content item's respective final scores; and providing the selected sponsored content items for presentation with the content item.

24. The one or more disk devices of claim 23, wherein the sponsored content items comprise one or more advertisements.

25. The one or more disk devices of claim 23, wherein the content item comprises a video file or stream.

26. The one or more disk devices of claim 23, wherein calculating one of the scores is further based on a user profile of a user accessing the document or the content item.

27. The one or more disk devices of claim 23, wherein calculating one of the scores is further based on metadata associated with the content item.

28. The one or more disk devices of claim 23, wherein calculating one of the scores is further based on content of a second different document that contains a hyperlink to the content item.

29. The one or more disk devices of claim 28, wherein the content of the second different document that contains the hyperlink to the content item comprises anchor text of the hyperlink.

30. The one or more disk devices of claim 23, wherein:

the content item includes audio data, and wherein the analysis of the content item comprises a speech recognition analysis of the audio data.

31. The one or more disk devices of claim 30, wherein the speech recognition analysis of the audio data comprises a determination of a confidence level for each of one or more terms in the audio data.

32. The one or more disk devices of claim 23, wherein:

the content item includes visual data; and wherein the analysis of the content item comprises an image recognition analysis of the visual data.

33. The one or more disk devices of claim 23, wherein selecting one or more of the candidate sponsored content items comprises selecting one or more of the candidate sponsored content items based on respective bids associated with the candidate sponsored content items.

* * * * *

UNITED STATES PATENT AND TRADEMARK OFFICE
CERTIFICATE OF CORRECTION

PATENT NO. : 8,433,611 B2
APPLICATION NO. : 11/850652
DATED : April 30, 2013
INVENTOR(S) : Reuven Lax et al.

It is certified that error appears in the above-identified patent and that said Letters Patent is hereby corrected as shown below:

Title Page 3, Column 2, Line 9 in the listing of Other Publications, delete "Tretived" and insert -- Retrieved --.

Title Page 3, Column 2, Line 9 in the listing of Other Publications, delete "Retrived" and insert -- Retrieved --.

Signed and Sealed this
Fifteenth Day of October, 2013

Teresa Stanek Rea
*Deputy Director of the United States Patent and Trademark Office*

UNITED STATES PATENT AND TRADEMARK OFFICE
CERTIFICATE OF CORRECTION

PATENT NO. : 8,433,611 B2  
APPLICATION NO. : 11/850652  
DATED : April 30, 2013  
INVENTOR(S) : Lax et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 128 days.

Signed and Sealed this
Second Day of December, 2014

Michelle K. Lee
*Deputy Director of the United States Patent and Trademark Office*